United States Patent
Bertelsen et al.

(10) Patent No.: US 12,123,396 B2
(45) Date of Patent: Oct. 22, 2024

(54) METHOD FOR CONTROLLING A WIND TURBINE SYSTEM IN RELATION TO BRAKING OF THE YAW SYSTEM

(71) Applicant: VESTAS WIND SYSTEMS A/S, Aarhus N. (DK)

(72) Inventors: Thorkild Møller Bertelsen, Sabro (DK); Morten Bagger Søgaard, Thisted (DK); Jesper Lykkegaard Neubauer, Hornslet (DK); Tiago Telmo Pinto de Oliveira, Valongo (PT); Peter Fynbo, Risskov (DK); Martin Møller Sørensen, Viby J (DK); Carsten Krogh Nielsen, Hammel (DK); Asier Berra, Billund (DK); Anders Hjarnø Jørgensen, Nibe (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 17/920,675

(22) PCT Filed: Apr. 22, 2021

(86) PCT No.: PCT/DK2021/050119
§ 371 (c)(1),
(2) Date: Oct. 21, 2022

(87) PCT Pub. No.: WO2021/213602
PCT Pub. Date: Oct. 28, 2021

(65) Prior Publication Data
US 2023/0151797 A1 May 18, 2023

(30) Foreign Application Priority Data

Apr. 24, 2020 (DK) .......................... PA 2020 70255
Sep. 23, 2020 (DK) .......................... PA 2020 70632

(51) Int. Cl.
*F03D 7/02* (2006.01)

(52) U.S. Cl.
CPC ......... *F03D 7/0204* (2013.01); *F03D 7/0244* (2013.01); *F03D 7/0248* (2013.01); *F05B 2260/902* (2013.01); *F05B 2270/602* (2013.01)

(58) Field of Classification Search
CPC .... F03D 7/0204; F03D 7/0244; F03D 7/0248; F05B 2260/902; F05B 2270/602; F05B 2260/903; Y02E 10/72
See application file for complete search history.

(56) References Cited

U.S. PATENT DOCUMENTS

| 2013/0088009 A1* | 4/2013 | Cousineau ............ F03D 7/0204 290/44 |
| 2013/0099494 A1* | 4/2013 | Numajiri ............... F03D 7/0212 290/44 |

(Continued)

FOREIGN PATENT DOCUMENTS

| CN | 106545600 A * 3/2017 |
| DE | 10219664 A1 * 11/2003 ............. F03D 17/00 |

(Continued)

OTHER PUBLICATIONS

Machine Translation of (DE 10219664) (Year: 2003).*

(Continued)

*Primary Examiner* — Brian Christopher Delrue
(74) *Attorney, Agent, or Firm* — Patterson + Sheridan, LLP

(57) ABSTRACT

The invention relates to a method for controlling a wind turbine system, more particular for a controlled sliding strategy to lower loads on the yaw system by controlling mechanical brakes and motor brakes in the yaw drive actuators. When the yaw system being in the non-yawing operational state, and the mechanical brake(s) being in an engaged state, and the yaw controller determines or receives (Continued)

a signal indicative of a yaw moment, and if the signal indicative of a yaw moment is above a signal threshold, then the yaw controller sends a braking signal to the yaw drive actuators to enter the motors into the brake state to apply a braking torque.

18 Claims, 7 Drawing Sheets

(56) References Cited

U.S. PATENT DOCUMENTS

| | | | |
|---|---|---|---|
| 2013/0170989 A1 | 7/2013 | Trede et al. | |
| 2013/0272842 A1 | 10/2013 | Juhl | |
| 2015/0275858 A1* | 10/2015 | Frederiksen | F03D 7/0204 415/4.5 |
| 2015/0369213 A1* | 12/2015 | Jakobsson | F03D 15/00 416/153 |
| 2017/0152835 A1* | 6/2017 | Bønding | F03D 7/0276 |
| 2020/0403481 A1* | 12/2020 | Recktenwald | H02K 7/116 |
| 2022/0065227 A1* | 3/2022 | Dalsgaard | F03D 7/046 |
| 2023/0003199 A1* | 1/2023 | Arroyo Beltri | F03D 17/00 |

FOREIGN PATENT DOCUMENTS

| | | |
|---|---|---|
| EP | 3450745 A1 | 3/2019 |
| WO | 2018157897 A1 | 9/2018 |
| WO | 2019129326 A1 | 7/2019 |
| WO | 2021213602 A1 | 10/2021 |

OTHER PUBLICATIONS

Danish Patent and Trademark Office, 1st Technical Examination including The Search Report for Application PA 2020 70255 dated Nov. 5, 2020.

PCT, International Search Report for Application PCT/DK2021/050119 dated Jul. 20, 2021.

PCT, Written Opinion of The International Searching Authority for Application PCT/DK2021/050119 dated Jul. 20, 2021.

* cited by examiner

METHOD FOR CONTROLLING A WIND TURBINE SYSTEM IN RELATION TO BRAKING OF THE YAW SYSTEM

FIELD OF THE INVENTION

The present invention relates to a method for controlling a wind turbine system, more particular for a controlling the yaw system by controlling mechanical brakes and motor brakes in the yaw drive actuators.

BACKGROUND OF THE INVENTION

The yaw system has the task of orienting the nacelle in relation to the wind. Most of the time the yaw system is inactive or parked. Only when the orientation of the nacelle needs to be changed, usually due to changes in the wind direction, the yaw system is active to turn the nacelle into the wind.

In a normal operation mode, the deviation between the nacelle and the wind direction, the yaw angle, is supposed to be as small as possible to avoid power production loss and to reduce loads. However, at the same time the yaw system must not respond too sensitively, to avoid continuous small yaw movements, which would reduce the life of the mechanical components.

In modern wind turbine systems, a plurality of yaw drive actuators is used in the yaw system to orient the nacelle in relation to the wind.

When the yaw system is inactive or parked, mechanical brakes are normally engaged. However due to the size of modern wind turbine systems, the forces acting on the wind turbine, for instance from changes in wind direction, are considerable, and the load on the mechanical components can be quite large, which may require large and robust construction, including gear and mechanical brakes.

Hence, an improved method for controlling the brakes in a wind turbine would be advantageous, and a more efficient and/or reliable method to control the mechanical brakes would be advantageous.

SUMMARY OF THE INVENTION

It is an object of the invention to provide a way of controlling the yaw system of a wind turbine such that the yaw system is capable of handling loads on the mechanical components in a manner, where mechanical components can be reduced in size and costs, as compared to a system where the loads are handled by mechanical components alone.

It is also an object of the invention to improve control methods of wind turbines, particularly to controlling methods, which improve lifetime of components of the yaw system.

Moreover, a further object of the invention relates to the ability of being able to operate a turbine with partially defect yaw actuators.

Thus, the above described objects and several other objects are intended to be obtained in a first aspect of the invention by providing a method for controlling a wind turbine system, the wind turbine system comprises a nacelle, a tower and a yaw system, the yaw system comprises one or more yaw drive actuators and a yaw controller, the one or more yaw drive actuators comprises a motor and a mechanical brake;

the yaw system being operable in a yawing operational state to rotate the nacelle with respect to the tower, and in a non-yawing operational state, and the mechanical brake being operable to be in an engaged state or in a dis-engaged state, and the motor being operable to be in a brake state, where the motor applies a braking torque to oppose movement of the nacelle;

wherein, when the yaw system being in the non-yawing operational state, and the mechanical brake(s) being in an engaged state, and the yaw controller determines or receives a signal indicative of a yaw moment, and if the signal indicative of a yaw moment is above a signal threshold, then the yaw controller sends a braking signal to the yaw drive actuators to enter the motors into the brake state to apply a braking torque.

The yaw system comprises a plurality of yaw drive actuators, each comprising a motor and a pinion connecting the yaw drive actuator. The yaw system further comprises a yaw ring to which the plurality of actuators is connected. In embodiments, the yaw drive actuators comprise a variable frequency drive. The variable frequency drives are generally considered part of the yaw drive actuators even though the variable frequency drives can be located separated from the other parts of the yaw drive actuators. In other embodiments, the yaw drive actuators are not equipped with a variable frequency drive, instead the yaw drive actuators will receive an on/off actuation signal directly from the yaw controller. In further embodiments, a soft starter may be applied to the yaw drive actuator. The braking signal is typically in the form of a command to yaw in the opposite direction of the yaw moment.

Yawing or rotating is understood as is common in the art, as rotation of the nacelle in relation to the tower.

When the yaw system is in a yawing operational state, the nacelle is rotated relative to the tower either in a clockwise direction or in a counterclockwise direction. When the yaw system is in a non-yawing operational state the nacelle is not rotating and the mechanical brakes or the electrical motor brakes usually keep the nacelle non-rotating. However, sliding can occur, if the forces effecting the system are too large for the brakes to hold.

Regarding braking in this invention, it is distinguishing between a mechanical brake, which is a brake torque from the friction brake mounted at the motor, and an electrical motor brake, which is a reverse torque generated by the motor.

The mechanical brakes can be in an engaged state or in a disengaged state. The motor brake can be in a brake state to apply a breaking torque to oppose movement or rotation of the nacelle. The yaw system comprises a yaw ring, and the breaking torque is applied to the yaw ring to oppose movement or rotation of the yaw system, and thereby oppose movement or rotation of the nacelle. This includes imposing counter movement, i.e. applying counter torque beyond the time where the sliding has stopped, e.g. to move the nacelle to its pre-sliding position, or until the nacelle is upwind again.

When the yaw controller receives or detects a signal indicative of a yaw moment, and if this yaw moment is above a signal threshold, then the yaw controller sends a signal to the yaw drive actuators to activate the motor brakes by entering the brake state and apply a breaking torque to the yaw ring. The yaw moment is the moment applied by external forces to the yaw system often caused by changes in the direction of the wind.

Moreover, there is also a bearing friction, which creates a friction torque, which the motor, when used to apply an active torque, shall overcome. On the other hand, the bearing friction torque helps reduces the loads seen by the drives in a situation where the nacelle is supposed to be stopped.

Generally, the motors are active during active yaw and at high external loads requiring motor braking; otherwise the mechanical brakes are engaged. In an embodiment, the motors operate as a generator brake at high external load and let the nacelle slide at controlled load level. When sliding above a signal threshold in the mechanical brakes is detected, all mechanical brakes are released and the motors activated in brake state, so that the motors create a counter torque against the sliding. The maximum capacity of the brakes is below the capacity of the gearbox and pinion, so sliding will occur in the brake prior to exceeding the design load for gearbox and pinion.

Currently, in prior art solutions, the yaw drive actuators are designed to cope with the highest loads that can occur. Important benefits of using the method of this invention is that it is avoided designing the yaw drives to the highest loads and thereby, it allows reducing the size of the key components within the yaw system. Also, the sliding performance may reduce loads seen by other components and potentially also reduce the risk of oscillations. Moreover, the sliding functionality may reduce the amount of wear seen on the existing mechanical yaw motor brakes, thereby improving lifetime of components of the yaw system.

The motors are preferable electrical drive motors, which typically will be asynchronous induction motors, but also can be permanent magnet motors. The motors are each powered by a separate variable frequency drive or controllable power supplies, enabling motor control. Depending on the embodiment, the motors may be individually controlled or collectively controlled. Alternatively, the motors can be hydraulic drive motors.

In embodiment applying variable frequency drives, the drives are connected to the motor controller in the yaw system and receives an output signal from the motor controller.

A tower can be any support structure or construction on which one or more nacelles can be mounted and be rotatable relative to the tower. The tower can comprise support arms, with nacelles mounted on each support arm; therefore, the wording "to rotate the nacelle with respect to the tower" also covers when a nacelle placed on a support arm is rotated. Further, an embodiment is possible, wherein the support arms are rotatable relative to the tower, so that the nacelles are rotated simultaneous relative to the tower, when the support arms are rotated relative to the tower; therefore, the wording "to rotate the nacelle with respect to the tower" also covers this situation.

According to an embodiment, the method comprises that the yaw controller determines the signal indicative of a yaw moment by detecting a sliding of the mechanical brakes.

The detection of sliding can for instance be done by detecting motor position change.

In an embodiment, the signal indicative of a yaw moment is detected by the motor controller, e.g. by detecting a voltage level or receiving an encoder signal.

According to an embodiment, the method comprises that the yaw controller determines the signal indicative of a yaw moment based on a determination of a probability of sliding of the mechanical brakes.

When sliding or a probability of sliding is detected the yaw controller sends a signal to the yaw drive actuators and then the motor braking torque is activated in the yaw drive actuators counteracting the sliding. The motor braking torque is a reverse torque generated by the motor.

Determination of a probability of sliding may be done by analysing external forces working on the wind turbine system. The external forces, detected by a plurality of sensors, generates a yaw moment, and if the yaw moment becomes so high that there will be sliding or a risk of sliding, the yaw controller can signal the yaw drives actuators for the motors to apply a counter torque to oppose the yaw moment.

According to an embodiment, the method comprises that the one or more yaw drive actuators comprises an encoder for detecting sliding or a probability of sliding, and wherein the signal indicative of a yaw moment is based on a signal from the encoder.

An encoder is a device in the yaw drive actuator detecting motor speed and the motor position that is the motor angle relative to an initial position, if changes in the position angle is detected; this may be used as an indicative of sliding occurring.

The encoder may be used for detecting sliding, but an encoder may not be present for all motors. For instance, an encoder can be on only on selected motors, for instance on only two motors. Further, an embodiment without any encoders is also possible.

According to an embodiment, the method comprises that the yaw controller determines the signal indicative of a yaw moment by detecting a movement of the nacelle. That is the signal indicative of a yaw moment is based on a yaw position signal obtained from a yaw position detector.

The signal indicative of a yaw moment can e.g. be based on a measurement of the absolute yaw slip goes above a certain limit, i.e. how much the nacelle has turned since the last time the yaw motors was stopped and brakes activated, this may be obtained by subtracting the current yaw position from last stop position. The signal indicative of the yaw moment may also be based on a yaw speed, e.g. obtained from differentiating the nacelle position signal, and base the signal indicative of a yaw moment on a measurement when yaw speed goes above a specified limit.

In an embodiment the braking signal to the yaw drive actuators may be applied when the nacelle position has moved 2 degrees during the non-yawing operational state.

The signal indicative of a yaw moment or the threshold may in embodiment further be made dependent on the wind speed, power production, rotor/generator speed and other parameters describing the severity of a slip. Moreover, sensor signals from various sensors used to detect such values like thrust, blade loads, wind direction, gyro signals, accelerometer signals etc. may be used to estimate the yaw moment and with it the probability of sliding.

In embodiments, the threshold may be set lower at higher wind speeds, higher power production, higher rotor/generator speeds, and higher slip speed to react earlier in such situations.

In an embodiment, the threshold may be set higher if the turbine is either not producing power or at low power production to lower the number of activations of the motors According to an embodiment, the method comprises that when the signal indicative of a yaw moment being above the signal threshold, the mechanical brakes are released. The release may be immediately.

If sliding is detected, and if the sliding is above a threshold, it is likely the sliding will continue and this to impose significant wear on the mechanical brakes. In embodiments, when the yaw moment is an above the signal threshold the mechanical brakes are released to avoid damage and wear on the mechanical brakes.

According to an embodiment, the method comprises that when the signal indicative of a yaw moment being above the signal threshold and the braking torque applied by the motor is larger than a minimum torque, the mechanical brakes are released. In order to vary the applied torque, a variable frequency drive may be needed. In embodiment without a variable frequency drive, the mechanical brakes may be released based on alternative input, or simply released immediately.

Before the mechanical brakes are released, it is advantageous that the motor has started braking by applying a braking torque opposing the yaw moment, so that the motor brake gradually takes over braking the yaw system from the mechanical brakes to avoid a sudden release of the mechanical brakes.

According to an embodiment, the method comprises that when the signal indicative of a yaw moment being above the signal threshold, the braking torque applied by the motor is ramped up until a selected braking torque is applied.

By ramping up the braking torque applied be the motor, the moment affecting the mechanical brakes will gradually be reduced avoiding sudden changes that might damage the mechanical brakes of other components in the yaw system.

According to an embodiment, the method comprises that when sliding is detected and the sliding speed is higher than a threshold speed, the mechanical brakes are released.

If the sliding speed is higher than a threshold speed, there is a risk that the sliding will continue and as the mechanical brakes are unable to hold the system, the mechanical brakes are released to avoid damage, and being able to ensure a controlled stopping of the system. The release of the mechanical brakes may be immediately or may wait for the motor breaks to be engaged.

According to an embodiment, the method comprises that when sliding is detected, the sliding speed is determined, and wherein the applied braking torque is set in dependency of the sliding speed.

The braking torque applied by the motors can be set to be proportional to the sliding speed or proportional to a detected yaw moment.

According to an embodiment, the method comprises that the yaw controller receives measurement values from a plurality of sensors and the yaw controller uses the measurement values to determine a probability of sliding.

In many places on the wind turbine systems sensors are present to detect many different measurement values like thrust, blade loads, wind direction, gyro signals, accelerometer signals etc. The method of this invention can take advantage of these sensors, to use measurements from these sensors to estimate the yaw moment and with it the probability of sliding.

According to an embodiment, the method comprises that the measurement values received by the yaw system from a plurality of sensors comprises measured thrust, estimated thrust and/or blade loads and/or wind direction and/or gyro signals in the nacelle and/or accelerometer signals in the nacelle and/or signals from a torque sensor or a torque transducer.

According to an embodiment, the method comprises that the signal indicative of a yaw moment is based on signals from a plurality of yaw drive actuators, and where signals from a sub-group of the yaw drive actuators are dis-regarded.

The signals from the plurality of yaw drive actuators typically is the speed of the motor but can also be changes in the angular position of the motor.

It can be advantageous only to use the signals from a selected sub-group of yaw drive actuators. Some yaw drive actuators might act atypical with values, typically measured by the encoder, like motor speed differing considerable from the average motor speed, it can then be an advantage to dis-regard these atypical measurements. Yaw drive actuators can act atypical due to for instance broken gears. Further, some yaw drive actuators that was dis-regarded by choice, for instance a choice made by an operator setting a dis-regard parameter in the setup of the system, for instance yaw drive actuator without an encoder can be dis-regarded.

In a general embodiment, the braking torque is applied while the signal indicative of a yaw moment is above the signal threshold. However, in embodiments the braking torque may be applied beyond the time where the yaw moment is reduced below the signal threshold, and until a dedicated stop criterion is fulfilled.

In an embodiment the braking torque is applied until the original stop position is reached, that is the braking torque is applied first to stop the sliding, and subsequently to move the nacelle back to the pre-sliding position. In another embodiment, the braking torque is applied until the nacelle is upwind, i.e. the relative wind direction is close to zero. It is advantageous to apply the braking torque in relation to the yaw error relative to the wind direction, as the wind direction may change while the yaw system is sliding.

In another embodiment, the stop criterion may also be directed to the speed of the movement of the nacelle, so that the braking torque is applied until the speed of movement of the nacelle is below a predetermined speed.

According to an embodiment, the method is operated on a wind turbine system comprises a plurality of nacelles and the yaw system is arranged to rotate one or more of the plurality of nacelles, i.e. a so-called multi-rotor turbine.

In a multi-rotor turbine, the nacelles may be mounted on support arms or other support structures allowing more nacelles mounted on the same wind turbine system. The method of the invention can be used to the plurality of nacelles individually, so that a single nacelle placed on a support arm can be rotated while the other nacelles are not being rotated. The method can also be used to rotate all the nacelles by rotating the entire structure, on which the plurality of nacelles is mounted, so that the plurality of nacelles is rotated simultaneous. The plurality of nacelles is then rotated relative to the tower and therefore each individual nacelle is rotated relative to the tower.

According to an embodiment, the method comprises that the yaw system receives measured or estimated trust on each of a plurality of rotors, and differences in the trust for a plurality of rotors is used to determine the signal indicative of a yaw moment to detect a probability of sliding.

In a multi-rotor turbine, the yaw moment working on the yaw system can be estimated by analysing the difference in trust measured or estimated for a plurality of rotors.

The invention may be implemented on a control system for controlling the yaw of a wind turbine.

A second aspect of the invention relates to a wind turbine, where the wind turbine further comprises a control system for controlling the yaw of the wind turbine system according to the first aspect.

A third aspect of the invention relates to a computer program product comprising software code adapted to control a wind turbine when executed on a data processing system, the computer program product being adapted to perform the method of the first aspect.

The different parts of the motor controller can be implemented in separate computer programs or as different functions in the same computer program running on the same or on separate microprocessors. Likewise, the motor controller and the yaw controller can be implemented in different software programs running on separate computers or microprocessors or be implemented in the same software programs running on the same computer or microprocessor or in any combination hereof.

In general, the various aspects and embodiments of the invention may be combined and coupled in any way possible within the scope of the invention. These and other aspects, features and/or advantages of the invention will be apparent from and elucidated with reference to the embodiments described hereinafter.

BRIEF DESCRIPTION OF THE FIGURES

Embodiments of the invention will be described, by way of example only, with reference to the drawings, in which.

The figures show one way of implementing the present invention and is not to be construed as being limiting to other possible embodiments falling within the scope of the attached claim set.

DETAILED DESCRIPTION OF AN EMBODIMENT

Figure 1:
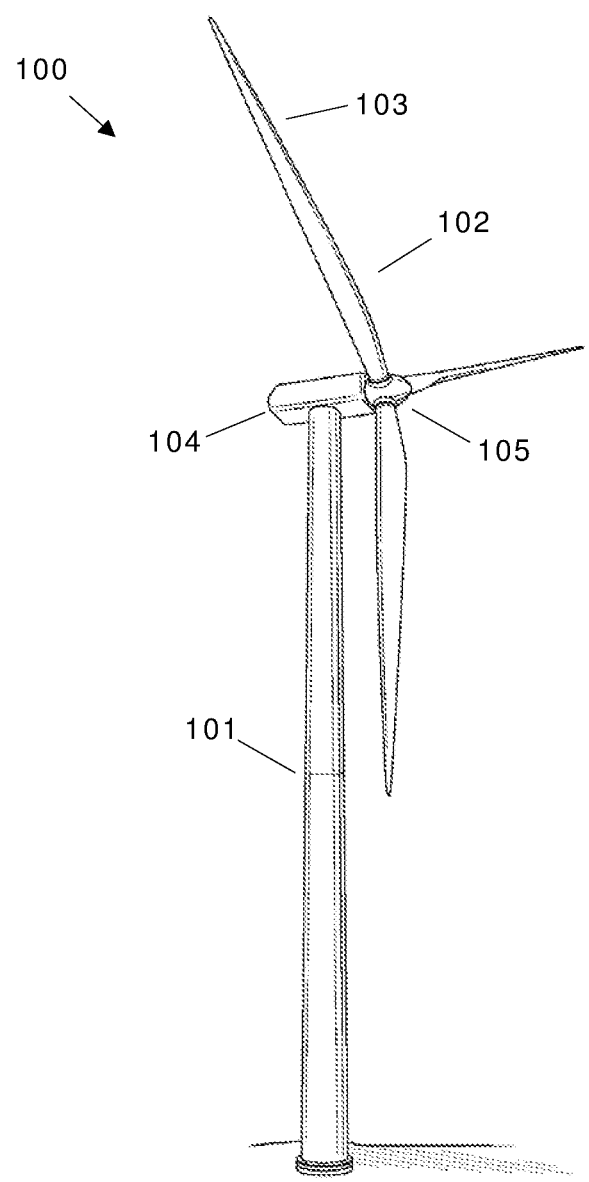
FIG. 1 illustrates a wind turbine.

FIG. 1 shows a wind turbine 100 (also commonly referred to as a wind turbine generator, WTG) comprising a tower 101 and a rotor 102 with at least one rotor blade 103. Typically, three blades are used, but a different number of blades can also be used. The blades 103 are connected with the hub 105, which is arranged to rotate with the blades. The rotor is connected to a nacelle 104, which is mounted on top of the tower 101 and being adapted to drive a generator situated inside the nacelle 104 via a drive train. The rotor 102 is rotatable by action of the wind. The wind induced rotational energy of the rotor blades 103 is transferred via a shaft to the generator. Thus, the wind turbine 100 is capable of converting kinetic energy of the wind into mechanical energy by means of the rotor blades and, subsequently, into electric power by means of the generator. The generator is connected with a power converter for injection the generated power into the utility.

Figure 2:
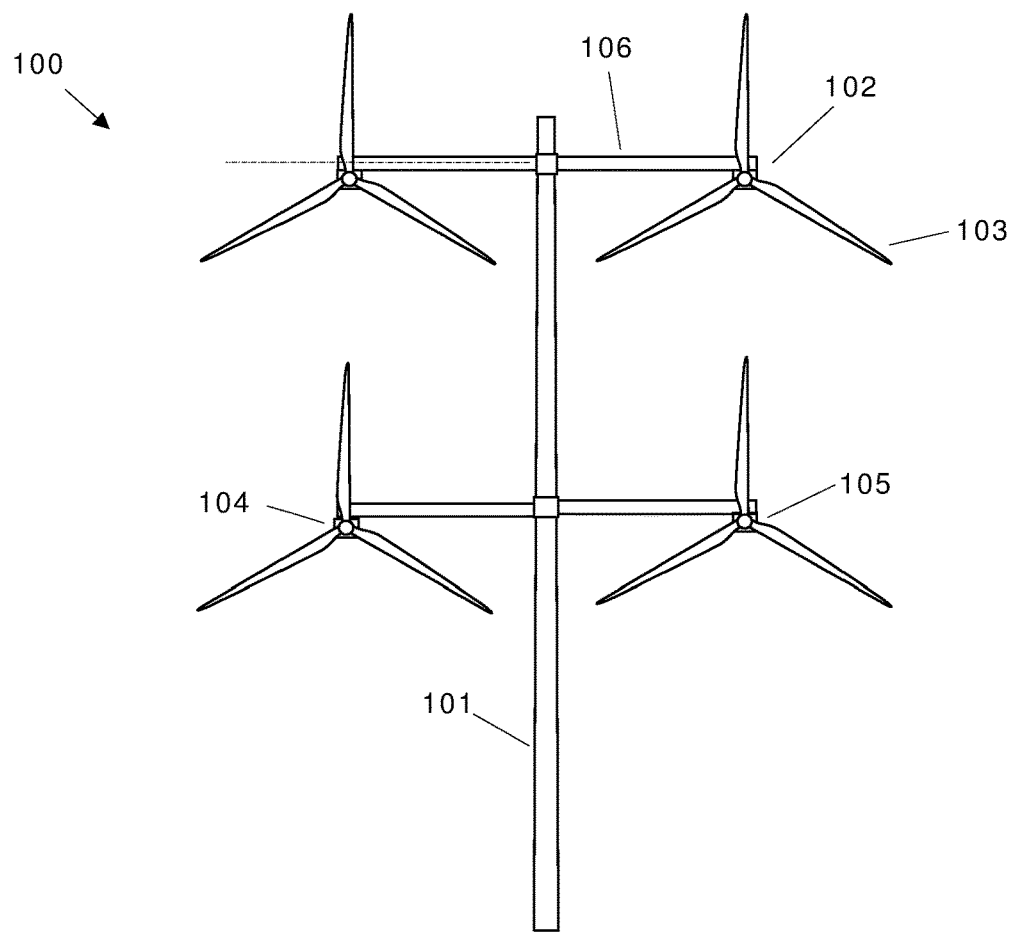
FIG. 2 illustrates wind turbines configured as multi-rotor wind turbines.
Figure 2:
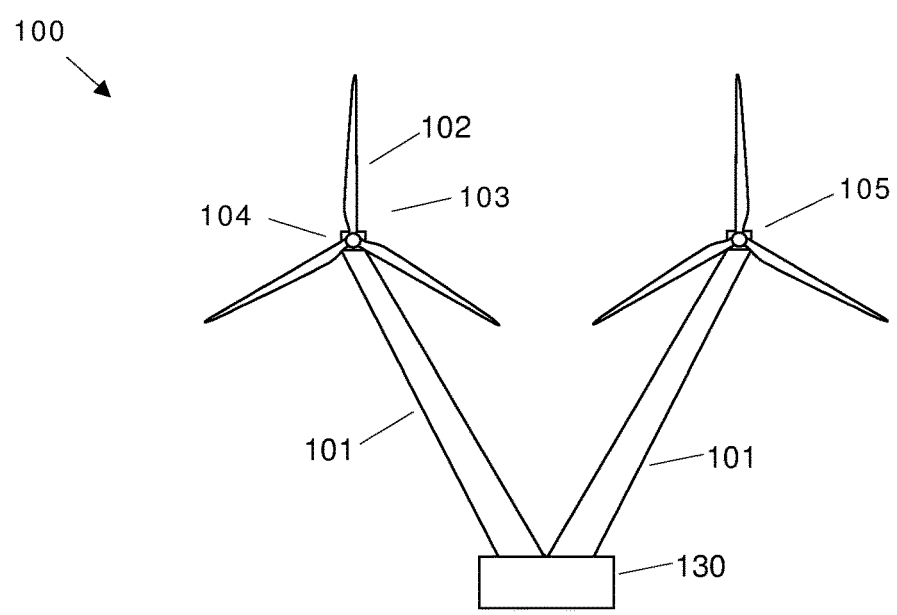

FIG. 2 shows alternative wind turbines 100 configured as multi-rotor wind turbines. Multi-rotor wind turbines comprise a plurality of nacelles 104. The nacelles 104 can be supported, as illustrated in the upper drawing, via a tower 101 and support arms 106 extending outwardly from the tower 101 so that the nacelles are placed away from the tower and on opposite sides of the tower. Here two arm levels are shown, however also embodiments with a single arm level, as well as three or more levels is possible. Alternatively, as illustrated in the lower drawing, the nacelles 104 can be supported by angled towers 101 extending from a foundation 130, e.g. a ground or floating foundation, so that two or more nacelles 104 are sufficiently separated from each other at a given height. Embodiments of the present invention may be used with multi-rotor wind turbines or single-rotor wind turbines.

Figure 3:
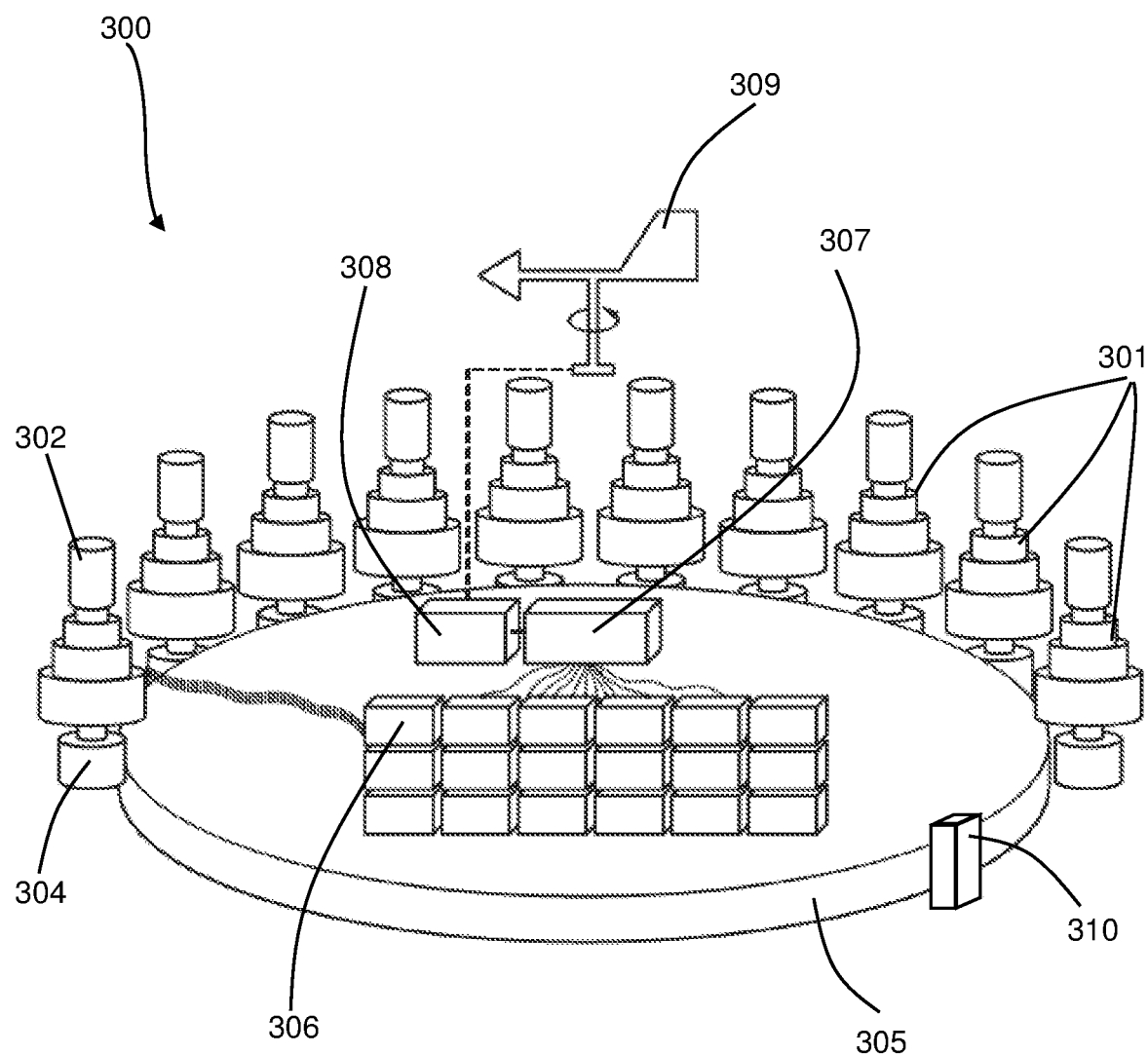
FIG. 3 illustrates the yaw system.

FIG. 3 shows an embodiment of a yaw system 300 in accordance with the present invention. In the illustrated example, the yaw system 300 comprises a number of yaw drive actuators 301 of which ten are shown on FIG. 3. In other configurations, more or less yaw drive actuators 301 may be used. Each yaw drive actuator 301 comprises a motor 302, in this embodiment an electrical drive motor, and a pinion 304. The pinion 304 is connecting the yaw drive actuator 301 and the yaw ring 305. In the illustrated embodiment, the yaw drive actuator 301 comprises a variable frequency drive (VFD) 306. However, the VFD need not be present and can be replaced by a power supply, possibly with a soft starter.

The motors 302 may be of the asynchronous induction motor type, possibly enabled for individual motor control, either via on/off control or via VFD control. In the embodiment with VFD control, the motors 302 may be operated in accordance with a 4-quadrant control scheme. The frequency drives 306 are seen in FIG. 3 to be clustered in a cabinet in the centre and being connected to the motor controller 307, however the frequency drives 306 can be placed in other locations as well.

The motor 302 comprises an encoder, which is a position meter, detecting the position of the motor, and from the angular changes in the position, the motor speed can be derived. The encoder is used to detect the speed of the motor 302 and return the speed to the frequency drive 306.

The encoder may be used for every motor 302 to detect the position and speed of the motor 302 and to ensure great load sharing, while avoiding overloading any of the motors 302.

The motor controller 307 may be arranged to output a torque reference to the variable frequency drives 306, and the motor controller 307 receives information about the motor speed either through communication with the encoder, the individual variable frequency drives 306 or through communication with the yaw controller 308. Further, the motor controller 307 receives signals from the yaw controller 308 about when to yaw and in which direction based on input from the wind direction device 309. However, the yaw controller 308, wind direction device 309 and cables for input power and communication are not a part of the yaw system 300.

The yaw controller 308 may control the yaw system 300, and the yaw controller 308 activates the motor controller 307 when yawing is needed.

The yaw controller 308 may be part of the turbine controller, e.g. a control module of the turbine controller, or may be a dedicated controller connected to the turbine controller.

As an addition or alternative to applying an encoder at the motors, a yaw position sensor 310 may be present. The yaw position sensor may be an optical sensor which detect the position of the nacelle, e.g. from detecting the position of the yaw ring. Another example includes a GPS mounted at the back of the nacelle which can detect the absolute nacelle position.

Figure 4:
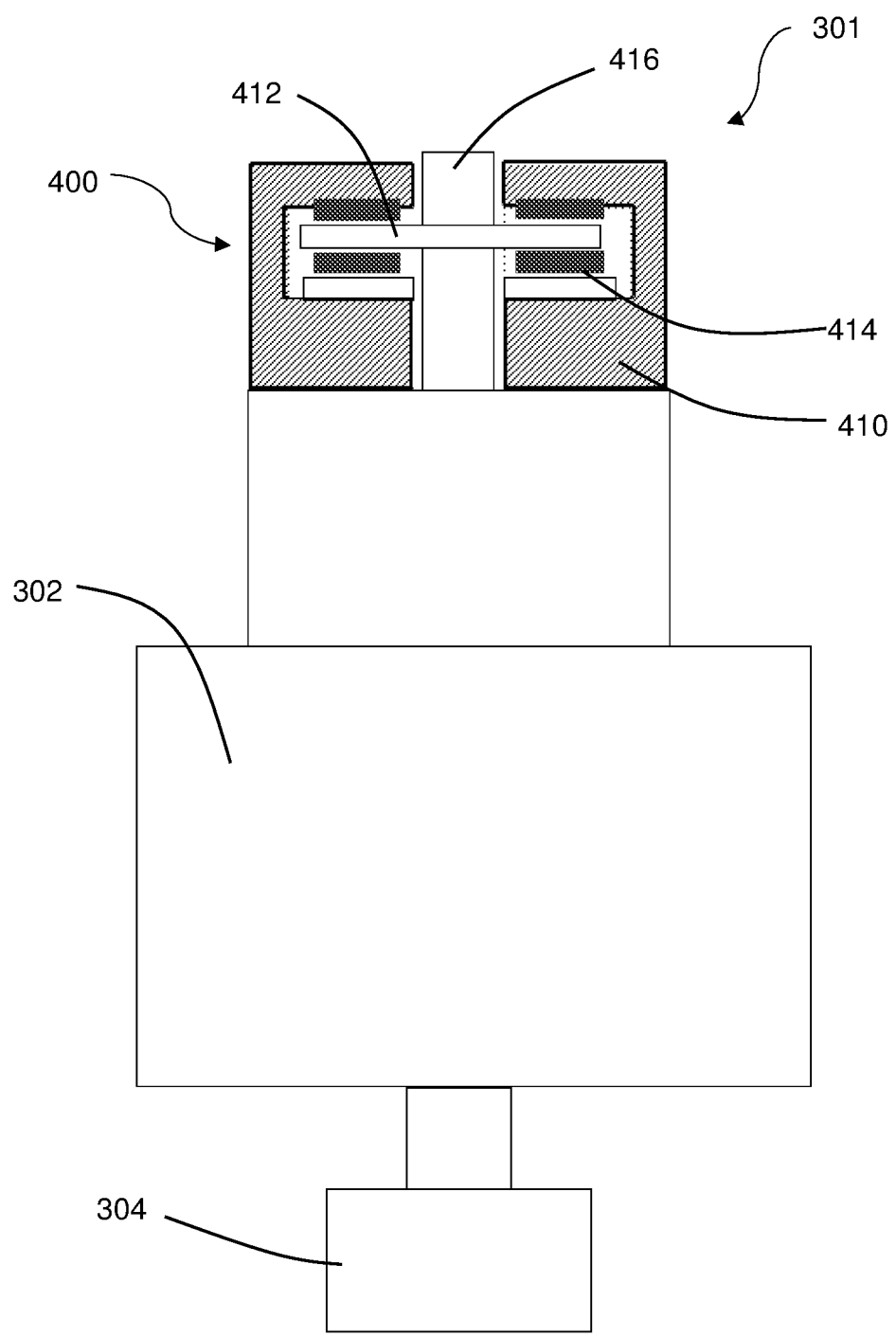
FIG. 4 is a schematic illustration of a yaw motor.

FIG. 4 is a schematic illustration of an electrical yaw drive actuator 301 including a mechanical brake 400. The mechanical brake 400 is connected to the motor 302 and the pinion 304 by a motor shaft 416. The mechanical brake 400 can be designed in different ways, but the one illustrated in FIG. 4 comprises a friction surface 414, forming the interface between the stationary part 410 and the rotating part, specifically the brake disk 412, of the motor. Further, the mechanical brake 400 comprises springs and coils (not shown). The mechanical brakes 400 are often normally closed meaning that if the coils are not energized the springs creates a force onto the friction surfaces 414 which prevents the rotation of the motor 302 by the friction surfaces 414 engaging the brake disk 412. When the coils are energized, they create a force counteracting the spring pressure, which releases the mechanical brakes 400, and thereby hinder the rotation or the motor 302 and the pinion 304. The pinion 304 is engaged with the yaw ring 305, and when the mechanical brakes 400 brake the pinion 303, the pinion 304 is hindering the nacelle 104 from rotating.

In an embodiment, the yaw system may be implemented to comprise three operation states:

a) "Parked by brake", wherein the mechanical brakes 400 are engaged. In this state detection of sliding in the mechanical brakes 400 may be set to be active. In an embodiment, if sliding in mechanical brakes 400 is detected above a signal threshold, the state changes to state "Parked by motor".

b) "Parked by motor", wherein the motors 302 are actively controlled to apply a braking torque to oppose movement of the nacelle 104, meaning that the electrical motor brakes are activated. In embodiments, the mechanical brakes 400 are disengaged in this state; however, the "parked by motor" state may also be selected before disengaging the mechanical brakes 400 in certain situations.

c) "Yawing", either clockwise or counterclockwise, wherein there is active yaw. The direction of the rotation of the nacelle 104 as well as the speed and torque may be set by an input signal. The "yawing" state is controlled by the commands from the yaw controller 308.

The yaw system 300 may be arranged for changing state from "parked by brake" to "parked by motor", when the angle of sliding is higher than a threshold value.

The yaw system 300 may be arranged for changing state from "parked by motor" to "parked by brake", when a signal is received from the turbine controller that the yaw moment has been below a given threshold for a time period, or when the moment applied by the motor 302 have been lower than a threshold value for a time period.

Figure 5:
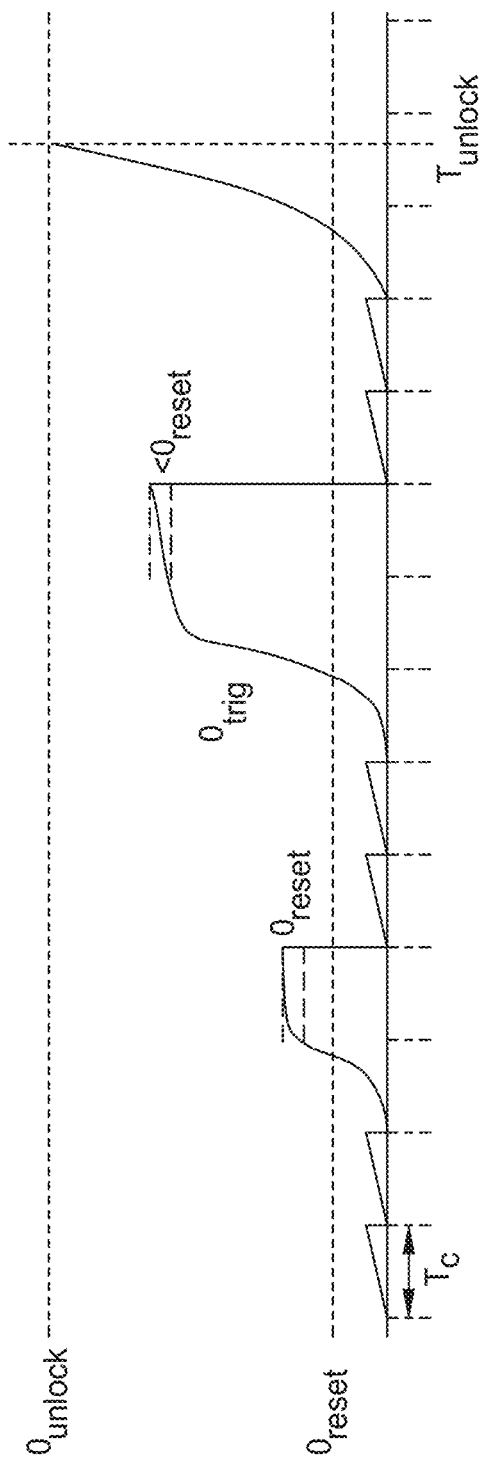
FIG. 5 illustrates an embodiment of a procedure to determine when to disengage the mechanical brakes and engage motor braking.

FIG. 5 illustrates an example of a procedure to determine when to disengage the mechanical brakes 400 and utilize motor braking, going from "Parked by brake" to "Parked by motor". Initially the yaw system 300 is in the state "parked by brake". $\theta_{trig}$ is the triggering state depending on the motor shaft angle, which triggers the mode switching to "parked by motor". The state changes to "parked by motor" if $\theta_{trig}$ is above the signal threshold $\theta_{unlock}$. $\theta_{trig}$ is the angle the motor shaft 416 has moved from an initial position. $\theta_{unlock}$ is the signal threshold that triggers the mode switching. If $|\theta_{trig}| > \theta_{unlock}$ the status changes to "parked by motor".

The angle $\theta_{trig}$ is checked every $T_c$ seconds and $\theta_{trig}$ is reset, if the change since last check is below a minimum threshold $\theta_{reset}$: $|\theta_{trig}(T_c(k)) - \theta_{trig}(T_c(k-1))| < \theta_{reset}$. This ensures minor sliding during a longer period do not initiate changing the state to "parked by motor".

The angle movement of the motor shaft 416 is monitored continuously during "Parked by brake". The triggering state $\theta_{trig}$ is changing in accordance with the measured motor shaft angle. Every time period of $T_c$, the state $\theta_{trig}$ is compared to the lower threshold level $\theta_{reset}$ and reset if $\theta_{trig} < \theta_{reset}$. The angle movement should be above the low angle threshold $\theta_{reset}$ in order to not reset after a short time period, $T_c$.

This ensures that the motor control is not activated, if there is neglectable sliding in the mechanical brakes 400 or movement in reality is integrated noise on the speed signal over a longer period. If $\theta_{trig} > \theta_{reset}$, the triggering state continuous to change in accordance with the motor shaft angle. If $\theta_{trig} > \theta_{unlock}$ the mechanical brakes 400 are released and "parked by motor" control is enabled.

Figure 6:
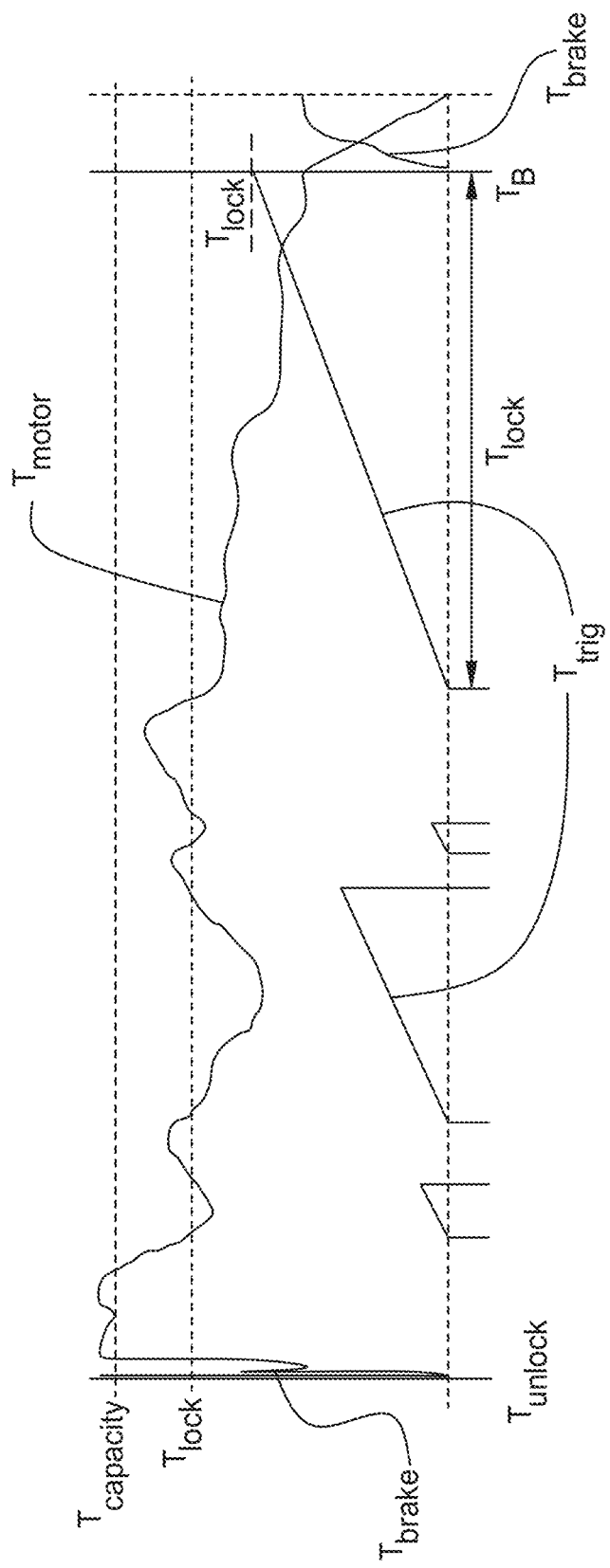
FIG. 6 illustrates an embodiment of a procedure to determine when to engage the mechanical brakes and disengage motor braking.

FIG. 6 illustrates an example of a procedure to determine when to engage the mechanical brakes 400 and disengage motor braking, going from "Parked by motor" to "Parked by brake".

$\tau_{motor}$ is the motor braking torque; the motor 302 must apply to counter the yaw moment, when "parked by motor". $\tau_{brake}$ is the braking torque the mechanical brakes 400 must apply to counter the yaw moment, when "parked by brake".

At $T_{unlock}$ the mode changes to "parked by motor", the mechanical brakes 400 are released and the $\tau_{brake}$ goes to zero, instead the motors 302 takes over going into brake state and applies a motor braking torque $\tau_{motor}$ which goes to $\tau_{capacity}$.

When $\tau_{motor}$ goes below $\tau_{lock}$, $\tau_{lock}$ is a certain level below the nominal sliding level $\tau_{capacity}$, a timer $T_{trig}$ starts. When the timer $T_{trig}$ has run for a time $T_{lock}$, indicating that the motor torque needed to keep the yaw system 300 from sliding has been below $\tau_{lock}$ for the time $T_{lock}$, the mode is changed to "Parked by brake. Now the mechanical brakes 400, at the time $T_B$, are engaged and they take over braking from the motors 402. The motor torque $\tau_{motor}$ is ramped down by lowing $\tau_{motor}$ to zero and $\tau_{brake}$ increases.

Figure 7:
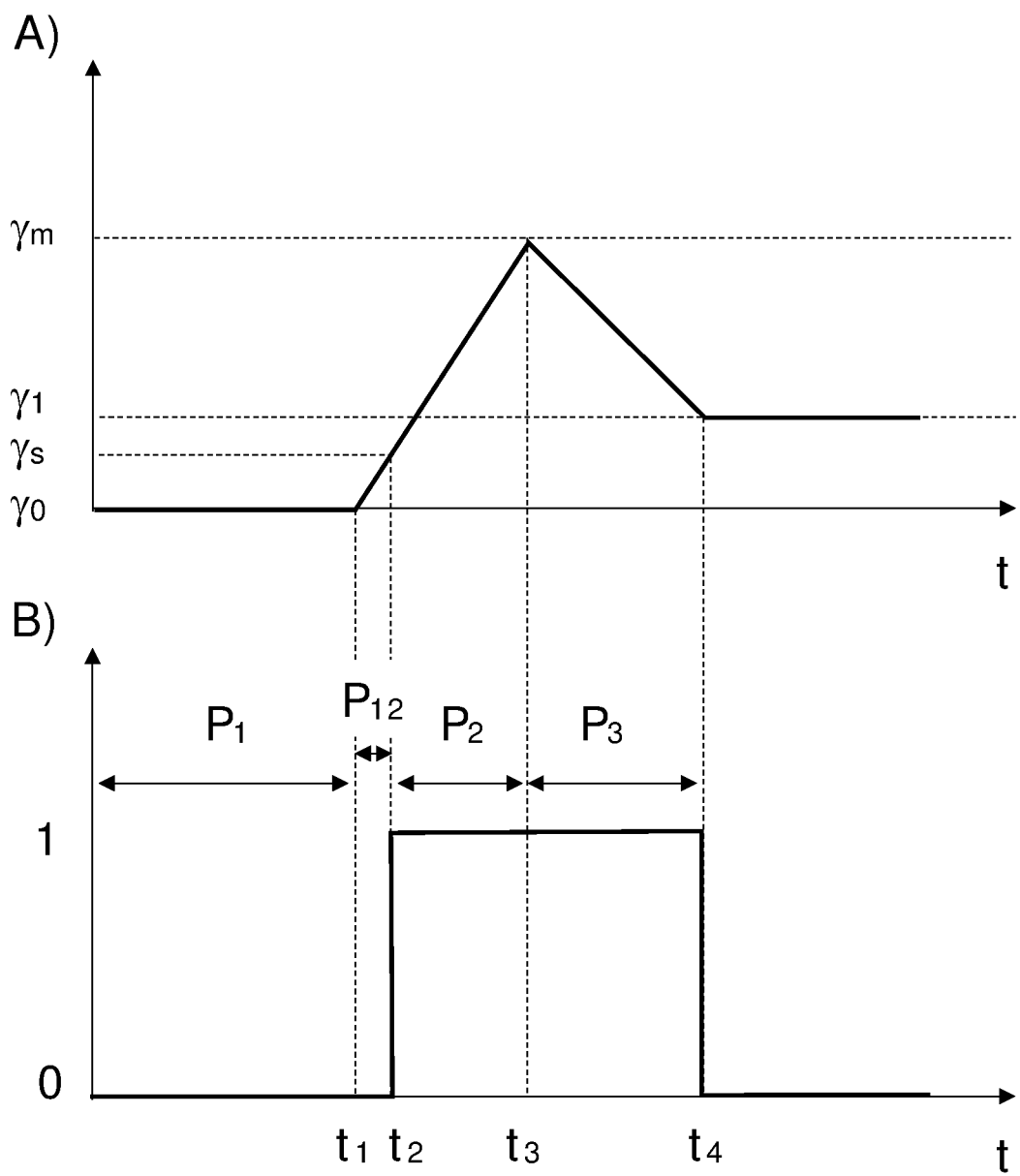
FIG. 7 illustrates an embodiment where the signal indicative of a yaw moment is based on a yaw position signal obtained from a yaw position detector.

FIG. 7 illustrates an embodiment where the signal indicative of a yaw moment is based on a yaw position signal obtained from a yaw position detector. The yaw position signal may be expressed in different ways. For example, the yaw position may be an angle, that is the nacelle angle. The angle may e.g. be expressed in relation to an absolute zero angle or relative to the last stop position. Use of a yaw position detector may e.g. be in a situation where the yaw motors are not equipped with a VFD.

In FIG. 7A, the nacelle position in the form of the angular position is shown as a function of time, while FIG. 7B shows the counteracting motor torque as a function of time. The motor torque is in the illustrated embodiment applied in an on/off fashion. In a first period, $P_1$, the nacelle is positioned at angle $\gamma_0$, and as the angle is constant the motors are in the brake state. At time $t_1$, the nacelle starts to slide (period $P_{12}$). Once it has been detected that the nacelle position has moved a predetermined amount to $\gamma_s$, a braking signal is provided to the yaw drive actuators so that the motor applies a motor braking torque. The nacelle keeps sliding until the applied motor braking torque is enough overcome the loads that makes the nacelle slide and thereby bring the nacelle sliding to a stop. This happens in period $P_2$ and stops at $t_3$ where the yaw angle is $\gamma_m$.

In the illustrated embodiment, the wind direction has changed during the sliding, and to place the nacelle in the upwind direction, the motor braking torque is applied until a stop criterion is fulfilled, i.e. including $P_3$. At time $t_4$, the nacelle position matches the wind direction, and the motors are stopped.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for controlling a wind turbine system, the wind turbine system comprising a nacelle, a tower and a yaw system, the yaw system comprising one or more yaw drive actuators and a yaw controller, the one or more yaw drive actuators comprising a motor and a mechanical brake:
the yaw system being operable in a yawing operational state to rotate the nacelle with respect to the tower, and in a non-yawing operational state, and
the mechanical brake being operable to be in an engaged state or in a dis-engaged state, and
the motor being operable to be in a brake state in which a braking torque is applied to oppose movement of the nacelle;
the method, comprising:
when the yaw system is in the non-yawing operational state and the mechanical brake is in the engaged state:
determining, by the yaw controller, a signal indicative of a yaw moment is above a signal threshold by detecting a movement of the nacelle, wherein detecting the movement of the nacelle comprises detecting a sliding of the mechanical brake;
in response to the determining, sending, from the yaw controller, a braking signal to the yaw drive actuators causing the motor to enter the brake state and ramp up the braking torque over a period of time; and
in response to determining the motor has ramped the braking torque up above a minimum braking torque, releasing the mechanical brake.

2. The method for controlling a wind turbine system according to claim 1, wherein the yaw controller determines the signal indicative of a yaw moment based on a determination of a probability of sliding of the mechanical brake.

3. The method for controlling a wind turbine system according to claim 1, wherein the one or more yaw drive actuators comprises an encoder for detecting sliding or a probability of sliding, and wherein the signal indicative of a yaw moment is based on a signal from the encoder.

4. The method for controlling the wind turbine system according to claim 1, wherein the signal indicative of a yaw moment is based on a yaw position signal obtained from a yaw position detector.

5. The method for controlling a wind turbine system according to claim 1, wherein, when sliding of the mechanical brake is detected and a sliding speed of the mechanical brake is higher than a threshold speed, the mechanical brake is released.

6. The method for controlling a wind turbine system according to claim 1, wherein, when sliding of the mechanical brake is detected, a sliding speed of the mechanical brake is determined, and wherein the applied braking torque is set in dependency of the sliding speed.

7. The method for controlling a wind turbine system according to claim 1, wherein, the yaw controller receives measurement values from a plurality of sensors and the yaw controller uses the measurement values to determine a probability of sliding.

8. The method for controlling a wind turbine system according to claim 1, wherein the signal indicative of a yaw moment is based on signals from a plurality of yaw drive actuators, and where signals from a sub-group of the yaw drive actuators are dis-regarded.

9. The method for controlling the wind turbine system according to claim 1, wherein the braking torque is applied until a stop criterion is fulfilled.

10. The method of claim 9, wherein the stop criterion comprises stopping the sliding of the mechanical brake.

11. The method of claim 10, wherein the stop criterion further comprises moving the nacelle back to a position the nacelle was in immediately prior to the sliding of the mechanical brake.

12. The method for controlling a wind turbine system according to claim 1, wherein the wind turbine system comprises a plurality of nacelles and the yaw system is arranged to rotate one or more of the plurality of nacelles, wherein the yaw system receives measured or estimated thrust on each of a plurality of rotors, and differences in the thrust for a plurality of rotors is used to determine the signal indicative of a yaw moment to detect a probability of sliding.

13. A wind turbine system comprising a mechanical brake and a control system for controlling the mechanical brake, wherein the control system is arranged to perform the method of claim 1.

14. A computer program product comprising software code adapted to control a wind turbine system when executed on a data processing system, the computer program product being adapted to perform the method of claim 1.

15. The method of claim 1, wherein the movement of the nacelle comprises a rotation of the nacelle.

16. The method of claim 15, wherein the signal indicative of the yaw moment indicates an amount the nacelle has rotated since the mechanical brake entered the engaged state.

17. A wind turbine system, comprising:
a tower;
a nacelle disposed on the tower; and
a yaw system operable in a yawing operational state to rotate the nacelle with respect to the tower, and in a non-yawing operational state; the yaw system, comprising:
a yaw controller;
one or more yaw drive actuators;
a mechanical brake operable in an engaged state or in a dis-engaged state; and
a motor operable to be in a brake state in which a braking torque is applied to oppose movement of the nacelle;
wherein the yaw system is arranged to perform an operation, comprising:
when the yaw system is in the non-yawing operational state and the mechanical brake is in the engaged state:
determining, by the yaw controller, a signal indicative of a yaw moment is above a signal threshold by detecting a movement of the nacelle, wherein detecting the movement of the nacelle comprises detecting a sliding of the mechanical brake;
in response to the determining, sending, from the yaw controller, a braking signal to the yaw drive actuators causing the motor to enter the brake state and ramp up the braking torque over a period of time; and
in response to determining the motor has ramped the braking torque up above a minimum braking torque, releasing the mechanical brake.

18. A non-transient computer readable medium comprising computer executable instructions to be executed by a data processing system to perform a method for controlling a wind turbine system; wherein the wind turbine system comprises:
- a tower;
- a nacelle disposed on the tower; and
- a yaw system operable in a yawing operational state to rotate the nacelle with respect to the tower, and in a non-yawing operational state; the yaw system, comprising:
  - a yaw controller;
  - one or more yaw drive actuators;
  - a mechanical brake operable in an engaged state or in a dis-engaged state;
  - a motor operable to be in a brake state in which a braking torque is applied to oppose movement of the nacelle; and
- wherein the method, comprises:
  - when the yaw system is in the non-yawing operational state and the mechanical brake is in the engaged state:
    - determining, by the yaw controller, a signal indicative of a yaw moment is above a signal threshold by detecting a movement of the nacelle, wherein detecting the movement of the nacelle comprises detecting a sliding of the mechanical brake;
  - in response to the determining, sending, from the yaw controller, a braking signal to the yaw drive actuators causing the motor to enter the brake state and ramping up the braking torque over a period of time; and
  - in response to determining the motor has ramped the braking torque up above a minimum braking torque, releasing the mechanical brake.

* * * * *